May 17, 1966  G. E. FENNER  3,251,222
STRAIN SENSITIVE APPARATUS AND ELEMENTS THEREFOR
Filed April 20, 1961  2 Sheets-Sheet 1
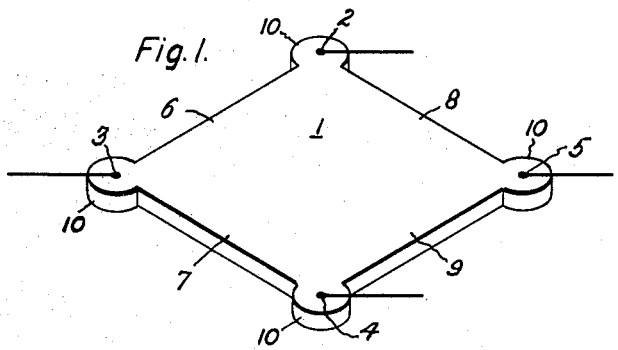
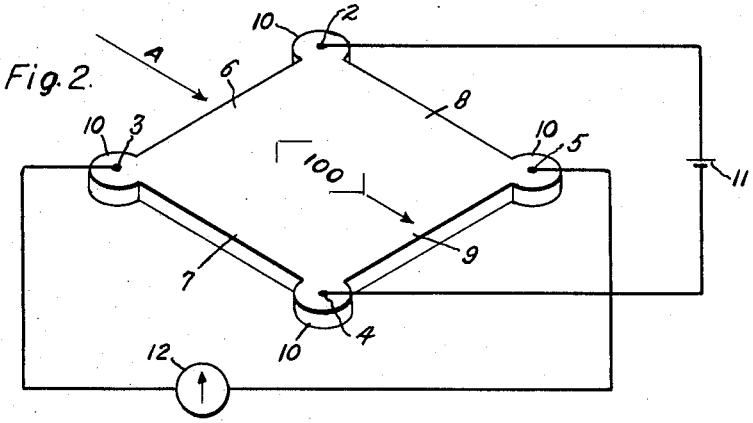
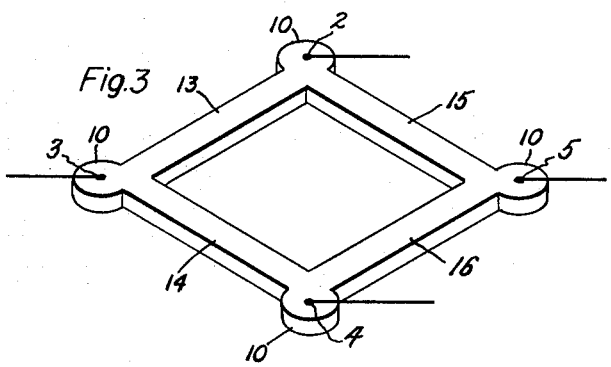
Inventor:
Gunther E Fenner,
by Joseph V. Claeys
His Attorney.

May 17, 1966  G. E. FENNER  3,251,222
STRAIN SENSITIVE APPARATUS AND ELEMENTS THEREFOR
Filed April 20, 1961  2 Sheets-Sheet 2

Inventor:
Gunther E. Fenner,
by *[signature]*
His Attorney

United States Patent Office 3,251,222
Patented May 17, 1966

---

3,251,222
STRAIN SENSITIVE APPARATUS AND ELEMENTS THEREFOR
Gunther E. Fenner, Schenectady, N.Y., assignor to General Electric Company, a corporation of New York
Filed Apr. 20, 1961, Ser. No. 104,271
10 Claims. (Cl. 73—88.5)

This invention relates to new and improved strain sensitive apparatus such as accelerometers, strain gauges and the like and to semiconductor strain sensitive element therefor.

Strain sensitive apparatus of the type to which this invention is directed usually employ a strain sensitive element which may be connected in various ways in an electrical circuit. For example, the operation of such apparatus depends upon the chracteristic change in electrical resistance exhibited by a conductor when placed in tensile or compressive stress. The strain sensitive element may form one or more arms of a four arm resistance bridge network. When the element is subjected to a strain, its resistance changes, resulting in an unbalance of the bridge which is detected by known types of electrical instruments.

Strain sensitive elements are known in the prior art, for example, in the form of fine resistance wires or elongated strips of semiconductive material such as germanium or silicon. Resistance wire elements have been found to be insufficiently sensitive for many of the more accurate indicating requirements. Although the semiconductor elements are not subject to this limitation, apparatus utilizing these prior known elements have not been entirely satisfactory since the characteristics of the elements employed therein are very temperature dependent. For example, there are many circumstances wherein it is required to provide a strain sensitive apparatus having means for compensating for temperature variations in the member being tested and also for differences in thermal expansion coefficients between the strain sensitive element and the member being tested so that the apparatus is responsive only to the strains induced in the test member by the applied forces. Prior art means for providing such compensation have not been entirely satisfactory and all such means contribute to the cost and the complexity of the apparatus.

It is an object of this invention, therefore, to provide a new and improved strain sensitive apparatus which substantially overcomes one or more of the disadvantages of prior art apparatus of this type and which is essentially independent of temperature.

It is another object of this invention to provide a unitary strain sensitive apparatus constructed from a single element of semiconductive material.

It is another object of this invention to provide a new semiconductor strain sensitive element which is particularly adapted for direct strain indicating applications involving simple forces.

It is still another object of this invention to provide a new semiconductor strain sensitive element which produces a linear variation in electrical resistance over an appreciable range of strain.

It is yet another object of this invention to provide a new semiconductor strain sensitive element which is inherently independent of temperature and of differences between the thermal expansion coefficients in the element and the member being tested so that the apparatus indicates only the strain induced in the test member due to the forces applied thereto.

It is a further object of this invention to provide a new semiconductor strain sensitive element which is extremely rugged and stable and has improved accuracy, sensitivity and reliability.

It is a still further object of this invention to provide a semiconductor strain sensitive element which exhibits the same characteristics independent of the size thereof.

Briefly stated, in accordance with one aspect of this invention, a strain sensitive element comprises a monocrystalline body of semiconductive material, having isotropic electrical characteristics, defining the four resistance arms of a complete four arm unitary resistance bridge. In the bridge unit so defined the ratio of the resistances of the two resistance arms defining one current path of the bridge is made equal to the ratio of the resistances of the two resistance arms defining the other current path thereof. The bridge unit is constructed with respect to the crystallographic orientation of the crystal to exhibit anisotropic elastoresistance characteristics. More specifically, the orientation is such that the longitudinal and transverse elastoresistance coefficients of the bridge unit are different from each other in either magnitude, polarity or both. First and second pairs of terminals are provided in nonrectifying connection to the extremities of the portions of the body forming the opposite ends of the unitary resistance bridge.

In another aspect of this invention a strain indicating apparatus comprises the above monocrystalline body of semiconductive material defining the four resistance arms of the four arm unitary resistance bridge making up the strain sensitive element. Means are coupled to one pair of terminals of the bridge unit to establish current flow in the two parallel current paths thereof. An electrical detecting means is coupled to the other pair of terminals and detects any change in condition of the bridge as a result of strain induced therein.

Due to the unitary structure of the resistance bridge and the isotropy of electrical characteristics of the semiconductive material from which it is constructed, changes in electrical characteristics due to temperature and the like are manifested equally to all portions of the bridge unit and causes no change in the operating condition thereof so that the operation of the apparatus is independent of temperature. Since there is an anisotropy of elastoresistance characteristics, however, the resistance is changed in both current paths when the body is placed in tensile or compressive stress to produce an appreciable change in the operating condition of the bridge. Specifically, there is a different change in resistance in the body in the direction perpendicular to and parallel with the components of strain respectively. As used herein, therefore, the term "electrical characteristics" is intended to specifically exclude the elastoresistance characteristics of the semiconductive material.

The features of my invention which I believe to be novel are set forth with particularity in the appended claims. My invention itself, however, both as to its organization and method of operation together with further objects and advantages thereof may best be understood by reference to the following description taken in conjunction with the accompanying drawing in which:

FIG. 1 is a diagrammatic illustration of a semiconductor strain sensitive element in accordance with one embodiment of this invention;

FIG. 2 is a schematic illustration of a strain gauge in accordance with this invention incorporating the strain sensitive element of FIG. 1;

FIG. 3 is a diagrammatic illustration of a semiconductor strain sensitive element in accordance with another embodiment of this invention and having improved sensitivity;

Figure 4:
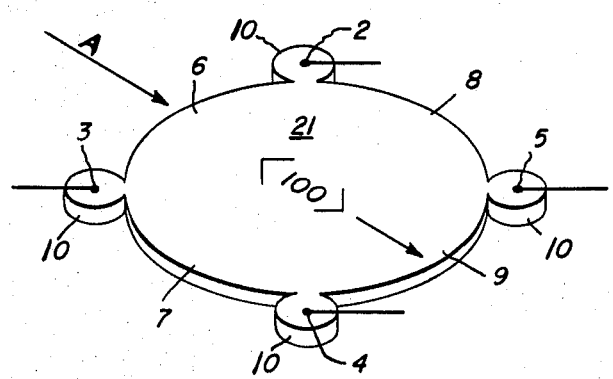
FIG. 4 is a diagrammatic illustration of a semiconductor strain sensitive element in accordance with another embodiment of this invention; and, FIG. 5 is a diagrammatic illustration of a semiconductor strain sensitive element in accordance with still another embodiment of this invention.

In FIG. 1 there is shown a semiconductor strain sensitive element in accordance with this invention. The semiconductor strain sensitive element, generally designated at 1 comprises a monocrystalline body of semiconductive material having uniform electrical characteristics. The body is chosen with respect to the crystallographic orientation of the single crystal from which it is "cut" to provide that the longitudinal and transverse elastoresistance coefficients are different from each other in either their magnitude, polarity or both. Some typical examples of semiconductor materials which for a given orientation provide elastoresistance coefficients of different polarity, for example, are P-type and N-type germanium and silicon and P-type lead telluride. Terminals 2, 3, 4 and 5 are provided in nonrectifying connection to opposite extremities of the body respectively so as to define therein four current carrying portions indicated generally at 6, 7, 8 and 9. The element 1 defines the four resistance arms of a four arm unitary resistance bridge wherein the resistances of the four current carrying portions 6–9 respectively constitute the resistance arms thereof. The body of monocrystalline semiconductive material is so dimensioned that the ratio of the resistances of the two resistance arms, defining one parallel current path of the operating bridge unit, is equal to the ratio of the resistances of the two resistance arms defining the other parallel current path thereof. For example, with a suitable voltage source connected to the terminals 2 and 4 the portions of the semiconductor body forming resistance arms 6 and 7 define one current path while the resistance arms 8 and 9 define the other current path.

As described hereinbefore the semiconductive material from which the element 1 is constructed has uniform electrical characteristics so that with good non-rectifying connections at the terminals 2, 3, 4 and 5 respectively, current flow in the two parallel current paths is symmetrical. As a practical matter, however, it is extremely difficult to obtain a completely nonrectifying connection to semiconductive material so that some injection of minority carriers ordinarily is present at each of these connections. Any rectifying action results in unequal currents in the various bridge arms due to temperature variations or the like and alters the isotropy of electrical characteristics of the unitary bridge formed by the monocrystalline semiconductor body producing an undesirable effect especially where accuracy is required. Preferably, therefore, means are provided to assure that there is a symmetrical current flow in the two parallel current paths of the unitary bridge formed by the portions 6 to 9 of the single crystal semiconductor body. This is conveniently and preferably accomplished in the element of this invention, for example, by providing extensions to the opposite ends of the body as shown at 10. These extensions provide for the recombination of some of the carriers which are injected due to any rectifying properties of the electrode connections as well as providing for symmetrical current flow in the two parallel current paths of the unitary bridge element 1. Alternatively, reducing the lifetime of injected minority carriers by known techniques may be employed to assure a more complete nonrectifying connection. For example, certain elements such as gold, nickel or the like may be diffused into the region of the body where the connection is made to accomplish such a result.

Although the extensions 10 are shown in FIG. 1 and the other figures of the drawing as having a curved or arc-like configuratiton it will be understood by those skilled in the art that it is the provision of the extension itself which assures such recombination of injected carriers and the symmetrical current flow so that the particular configuration thereof is not critical. The particular form usually is dictated by convenience of fabrication, structural strength or other like considerations.

Figure 5:
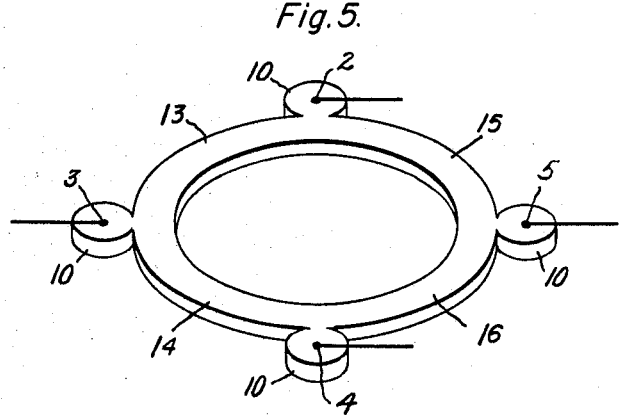

For illustrative purposes only the strain sensitive element 1 is shown in FIGS. 1, 2 and 3 of the drawings as a thin uniform square plate. The shape or size of element 1 is not critical, however, and may be conveniently in the form of a disk or other suitable configuration, as illustrated in FIGS. 4 and 5, provided that the ratio of the resistances of the two portions of the element forming the resistance arms defining one current path of the bridge unit is equal to the ratio of the resistances of the two portions of the element forming the resistance arms defining the other current path thereof. In an isotropic semiconductor body having a uniform thickness throughout this is often most conveniently accomplished, for example, by providing that the four current carrying portions 6 to 9 are similarly dimensioned such as is obtained when the element 1 is constructed in the form of a square or a disk. Further, it is to be understood that the thickness of the element 1 is not determinative of its operation. For a great many applications, however, the element is required to be suitably bonded or otherwise secured to the member to be tested and for this reason it is preferred that the element be thin. This serves to lessen the difficulty encountered in securing the element to the test member such that the maximum amount of strain is induced in the element for a given deformation of the test member.

Preferably the semiconductor single crystal from which the strain sensitive element 1 is to be fabricated is "grown" by one of the well-known crystal growing techniques which will assure the above referred to uniform electrical characteristics throughout. The provision of such uniform electrical characteristics assures, for example, that any changes in the electrical characteristics due to temperature or the like are the same in all four current carrying portions of the strain sensitive element 1 forming the complete resistance bridge and there will be no net change resulting therefrom to cause any change from the normally balanced condition. One example of a crystal growing method suitable for purposes of this invention is the method often referred to in the art as the Czochralski method. Alternatively, the semiconductor single crystal may be produced by an epitaxial growth method directly on to the surface of a suitable substance or on to the surface of a suitable test member itself, thereby obviating the difficulties often associated with the requirement for bonding or otherwise securing the element to the test member. For example, the substrate or test member should be appropriate single crystal semiconductive material. Epitaxial methods of crystal growth may similarly provide a crystal having uniform electrical characteristics throughout.

The above referred to methods of crystal growth are well-known in the art and will not be described in further detail herein. For example, reference to various suitable crystal growing techniques may be had by reference to the text entitled "Introduction to Semiconductors" by W. Crawford Dunlap, Jr., published in 1957 by John Wiley & Sons, Inc., New York. Similarly, further details on the epitaxial growth of crystals may be had by reference to the article entitled "Epitaxial Films of Silicon and Germanium by Halide Reduction" by H. C. Theurer et al., in the Journal of The Electrochemical Society, vol. 107, No. 12, December 1960, page 268c.

The unitary four arm resistance bridge of monocrystalline semiconductive material is so chosen with respect to the crystallographic orientation of the single crystal from which it is "cut" to provide that the "longitudinal" and "transverse" elastoresistance coefficients of the resulting bridge are different from each other in either their magnitude, polarity or both. Preferably, for best sensitivity, the element 1 is so selected that the "longitudinal" and "transverse" elastoresistance coefficients thereof are different in polarity, or that the difference in magnitude therebetween is large.

The strain sensitive element of this invention, therefore, is a unitary structure of monocrystalline semiconductive material forming a complete four arm resistance bridge. The unit exhibits isotropic electrical characteristics as, for example, equal changes in resistance in response to temperature variations and the like while at the same time exhibiting anisotropic elastoresistance characteristics as, for example, different resistance changes therein in a direction parallel with and perpendicular to components of strain.

Although unitary force-responsive devices have been constructed from a semiconductive element in the prior art, such devices depend upon the application of shear stress thereto and, therefore, are unsuitable for direct indicating applications involving simple forces. This invention is to be further distinguished from semiconductor strain sensitive devices of the above described type in that, although the element of this invention exhibits equal variations in electrical characteristics due to temperature and the like in all portions of the element 1, due to the isotropy of electrical characteristics of the material from which it is formed, it exhibits anisotropic variations in the resistance thereof when the element is placed in tensile or compressive stress. This anisotropy of elastoresistance characteristics results from the construction of the bridge unit with respect to the crystallographic orientation of the crystal. In accordance with this construction, therefore, a strain sensitive semiconductor element is provided having different longitudinal and transverse elastoresistance coefficients.

As used throughout the specification and in the appended claims the term "longitudinal" with respect to the elastoresistance coefficient refers to the change in resistivity when current and strain are measured parallel to each other. Similarly, the term "transverse" with respect to the elastoresistance coefficient refers to the change in resistivity when current and strain are measured perpendicular to each other.

Elastoresistance coefficients are well-known and may be determined for any given semiconductive material in well-known manner. For example, further general details on the determination of such elastoresistance coefficient may be had by reference to pp. 232–249 of "Solid State Physics, Advances in Research and Application," vol. 6, published in 1958 by Academic Press, Inc., New York. Still further details, respect to various specific semiconductive materials, may be had by reference to an article entitled "The Piezoresistance Effect and its Applications" by Lewis E. Hollander et al., published in "The Review of Scientific Instruments," vol. 31, No. 3, pp. 323–327, March 1960.

Although the above described semiconductor strain sensitive element has a wide variety of applications in various strain sensitive apparatus, it will be further particularly described with respect to a strain gauge such as shown schematically in FIG. 2.

In FIG. 2 there is shown a strain gauge in accordance with this invention incorporating the semiconductor strain sensitive element of FIG. 1. In FIG. 2 the four current carrying portions 6 to 9 of element 1 define the four resistance arms of a unitary resistance bridge. A voltage source, shown schematically as battery 11, is connected to the two opposite terminals 2 and 4 respectively, and defines in the element 1 a first parallel current path which includes the portions 6 and 7 and another parallel current path which includes the portions 8 and 9 thereof. A detecting means 12, such as a galvanometer, voltmeter or the like is connected to the remaining two opposite electrodes 3 and 5. Any unbalance of the bridge will be indicated by the detecting means 12 in known manner.

As described hereinbefore element 1 has been so constructed that the ratio of the resistances of the two portions of the element 1 which define one current path is equal to the ratio of the resistances of the two portions of the element 1 which define the other current path. For example, the relationship $$\frac{R_6}{R_7} = \frac{R_8}{R_9} \qquad (1)$$

is satisfied. Where the terms $R_6$, $R_7$, $R_8$ and $R_9$ refer respectively to the resistance values of the four current carrying portions 6 to 9 respectively of semiconductor strain sensitive element 1 or more specifically to the resistance arms 6–9 of the unitary resistance bridge defined thereby. As stated previously, for an isotropic semiconductor body of uniform thickness, for example, this is most conveniently accomplished by making all four portions 6 to 9 of equal dimensions, such as by providing element 1 in a square or circular configuration. It will be understood by those skilled in the art, however, that other more complex configurations may be provided, such as, for example, providing portions of different thickness or the like which will similarly establish the relationship set forth in Equation 1.

The bridge may be critically balanced to obtain the relationship required by Equation 1 by properly adjusting the resistance of the portions 6–9 of element 1. This may be very conveniently accomplished, for example, by removing some of the semiconductive material from the required portions by means of a suitable etching technique or by other suitable means known to those skilled in the art.

In operation, the semiconductor strain sensitive element 1 is cemented or otherwise suitably secured to the member being tested so that any deformation therein due to an applied force induces a strain in the element 1. For simplicity of explanation the net strain induced in the element 1 will be shown by the direction of the arrow A.

For further simplifications, the explanation of the operation of the strain gauge of FIG. 2 will be with reference to a particular strain sensitive element 1 fabricated of N-type silicon, although it is to be understood that any other semiconductive materials which satisfy the criteria hereinbefore described for element 1 are equally suitable. The element is further selected with respect to the crystallographic orientation of the single crystal from which it was fabricated such that the <100> direction is as shown. Such an N-type silicon strain sensitive element exhibits anisotropic elastoresistance coefficients. For example, such an element exhibits a transverse elastoresistance coefficient having a positive polarity and a longitudinal elastoresistance coefficient having a negative polarity. Since the N-type silicon material from which the element is formed has uniform electrical characteristics any changes therein due to temperature or the like are manifested uniformly throughout the element, however, because of the anisotropy of elastoresistance the body exhibits different changes in resistance in the directions parallel with and perpendicular to the components of strain therein.

Assume initially that no forces are applied to the test member and, therefore, there are no strains induced in the element 1 due to deformation thereof. Under such conditions the bridge in FIG. 2 is balanced and there is no indication on detecting means 12. That is, normally the unitary bridge formed by the element 1 is in a balanced condition. When the element 1 defining the complete unitary resistance bridge is subjected to a strain in the direction of the arrow A, however, there is a change in resistance in all four arms of the bridge resulting in an unbalance thereof and an indication on detecting means 12.

As described hereinbefore, the element 1 of the strain gauge of FIG. 2 has two parallel current paths. One of the paths includes the portions 6 and 7 of element 1 and the other path includes the portions 8 and 9 thereof. With the strain in the direction shown the resistance of the portions 6 and 9 is increased due to the positive transverse elastoresistance coefficient while the resistance of the portions 7 and 8 is decreased due to the negative longitudinal elastoresistance coefficient. For example, since the longtudinal elastoresistance coefficient relates to the change in resistivity in the body when current and strain are measured in the same direction it is clear that the resistance of both the portions 7 and 8 will decrease when the body is subjected to a strain in the direction shown by the arrow A since the longitudinal elastoresistance coefficient is negative and the current flow in the portions 7 and 8 is parallel to the direction of the strain in the body. Similarly, it is clear that the resistance of the portions 6 and 9 will be increased since the current flow therein is perpendicular to the direction of the strain in the body and therefore the transverse elastoresistance coefficient will determine the change in resistivity therein. Since this transverse elastoresistance coefficient is positive there will be an increase in resistance in these two portions. In summary, therefore, it may be stated briefly that when the element 1 is subjected to a strain there is a different resistance change produced in the body in the direction parallel with and perpendicular to the components of the strain respectively. Although for simplicity the strain has been shown along the direction A, parallel to the $<100>$ direction, it will be evident that different resistance changes are similarly produced in the body in the directions parallel to and perpendicular to the components of strain when subjected to a more complex strain as, for example, one in a diagonal direction.

The resulting increase in resistance in the current carrying portions 6 and 9 of the body, therefore, results in a greater voltage drop in these portions than was present in the normally balanced condition. The greater voltage drop across the portion 6, for example, results in the voltage at electrode 3 becoming less positive. Similarly, the resistance of the current carrying portion 8 is decreased for the reasons set forth above. This decrease is resistance in portion 8 results in a lower voltage drop thereacross than in its balanced condition and the voltage at electrode 5 becomes more positive. There is a relative voltage difference, therefore, between the electrodes 3 and 5 due to the different resistance changes in element 1 caused by this strain thereby changing the operating condition of the bridge. For example, the balanced condition is altered and this unbalance is measured by detecting means 12. The amount of the unbalance reflects the change in resistance due to the strain and, therefore, provides an accurate indication of the strain induced in the element and consequently the strain in the test member due to the forces applied thereto.

In FIG. 3 there is shown another embodiment of the strain sensitive element of this invention which provides for still greater sensitivity. The embodiment of FIG. 3 differs from that of FIG. 1 substantially only in the fact that a portion of the center of the single crystal body is removed thereby providing an element wherein the four current carrying portions are in the form of strips 13, 14, 15 and 16 respectively. With this configuration there is no possibility of any current path being established across the element. Increased sensitivity is achieved in that there are only the two distinct current paths; the first path, for example, including only the strips 13 and 14 and the second path including only the strips 15 and 16. It is clear, therefore, that there is no possibility of any current path being established diagonally across the element which would tend to reduce the sensitivity of the element to some extent.

As in the embodiment of FIG. 1 the shape and size of the element is not critical and the element, for example, may be constructed in the form of an annular disk or other suitable configuration. In this embodiment, however, it is easier to establish the relationship set forth by Equation 1 so that there is a great deal of freedom in the choice of body configuration which may conveniently and simply establish the required resistance ratio relationship. For example, this relationship may be as easily established for an irregularly shaped element as for a square or circular element since the required balance may be easily achieved by suitably proportioning the various strips 13–16.

An examination of the relationship set forth in Equation 1 shows that when satisfied, there is a zero indication on the detecting means 12 and the bridge is balanced. It is further evident that a maximum detector indication for a given strain, representing a maximum unbalance of the bridge, is produced when the resistance in the portions 6 and 9 of element 1 increases while at the same time the resistance in the portions 7 and 8 decreases. From the above detailed description of the strain sensitive element of FIG. 1 and the operation of the strain gauge of FIG. 2 it is clear that these are the exact results which are achieved by the novel semiconductor strain sensitive element of this invention. The resulting strain sensitive apparatus of this invention, therefore, is extremely sensitive, accurate and independent of temperature.

Since the semiconductive material from which the element 1 is fabricated has isotropy of electrical characteristics, there are like variations in resistance and other electrical characteristics in the same pairs of portions due to temperature so that the relationship set forth in Equation 1 is not altered due to temperature variations of the element as a whole and the normally balanced condition of the unitary bridge formed by element 1 is maintained. Further, since the element 1 is an integrated body any temperature condition affecting one portion of the element is very quickly equalized throughout the entire bridge. This is especially rapid in the integrated bridge unit because of the extremely good thermal conductivity. For example, there is no delay in such equalization of temperature such as is present in any strain sensitive apparatus wherein the temperature of one portion must be transferred through the bonding material to the material of the test member and so on to the other elements of the electrical circuit.

The operation of the apparatus of this invention is further independent of any differences in thermal expansion coefficients between the element 1 and the member being tested. For example, any difference in thermal expansion coefficients between the member being tested and the strain sensitive element 1 results in equal longitudinal and transverse strains being induced in the element 1. These equal longitudinal and transverse strains produce equal and opposite changes in the respective portions of the element 1 and there is no resulting unbalance of the bridge. The element 1 therefore provides inherent automatic compensation for temperature variations and for differences in thermal expansion between the element and the member being tested.

FIG. 4 is an illustration of the aforementioned disk configuration of a strain sensitive monocrystalline element constructed and operated in a manner similar to that described for the configurations of FIGS. 1 and 2, with like numerals identifying like structural portions thereof.

FIG. 5 illustrates another embodiment of the strain sensitive element of this invention, which provides for greater sensitivity than the element of FIG. 4. The embodiment of FIG. 5 is constructed and operated in a manner similar to that described for the embodiment of FIG. 3, with like numerals identifying like structural portions thereof.

While only certain preferred features of this invention have been shown by way of illustration, many modifications and changes will occur to those skilled in the art. It is, therefore, to be understood that the appended claims are intended to cover all such modifications and changes as fall within the true spirit and scope of this invention.

What I claim as new and desire to secure by Letters Patent of the United States is:

1. A strain sensitive element comprising: a monocrystalline body of semiconductive material in the form of a closed figure having four integral strips joined to define a complete unitary four active arm resistance bridge wherein each of said strips defines one resistance arm thereof, the ratio of resistances of two of the resistance arms defining one continuous current path within the semiconductive material of said bridge being equal to the ratio of resistances of other two resistance arms defining another continuous current path within the semiconductive material thereof, the arms of said bridge unit being oriented with respect to the crystallographic orientation of said monocrystalline body such that the bridge will exhibit anisotropic elastoresistance characteristics in response to a force selected from the group consisting of tensile and compressive forces acting on said element; said monocrystalline body including an extension protruding from each junction of said strips, each said extension being formed so that only a small fraction of the perimeter of said each extension is integral with the pair of strips forming said each junction, respectively; and nonrectifying terminals connected to said extensions.

2. A strain indicating apparatus comprising: a unitary four active arm resistance bridge having four resistance arms formed by a single body of monocrystalline semiconductive material having isotropic electrical characteristics, said arms being integrally joined at each end to form a quadrilateral, the ratio of resistances of two of the resistance arms defining one continuous current path within the semiconductive material of said bridge being equal to the ratio of resistances of the other two resistance arms defining another continuous current path within the semiconductive material thereof, the arms of said bridge unit being oriented with respect to the crystallographic orientation of said monocrystalline body such that the bridge will exhibit anisotropic elastoresistance characteristics in response to a force selected from the group consisting of tensile and compressive force acting on said body; said monocrystalline body including an extension protruding from each junction of said arms, each said extension being formed so that only a small fraction of the perimeter of said each extension is integral with the pair of arms forming said each junction, respectively; first and second pairs of terminals connected to the extensions of the portions of said body at opposite ends of said bridge, respectively; means coupled to said first pair of terminals for establishing current flow in the two continuous current paths of said bridge; and electrical detection means coupled to said second pair of terminals.

3. A strain indicating apparatus comprising: a unitary four active arm resistance bridge having four resistance arms formed by a single body of monocrystalline semiconductive material having isotropic electrical characteristics, said arms being integrally joined at each end to form a quadrilateral, the ratio of resistances of two of the resistance arms defining one continuous current path within the semiconductive material of said bridge being equal to the ratio of resistances of the other two resistance arms defining another continuous current path within the semiconductive material thereof, the arms of said bridge unit being oriented with respect to the crystallographic orientation of said monocrystalline body such that the bridge will exhibit longitudinal and transverse elastoresistance characteristics which differ in polarity in response to simple forces acting on said body; said monocrystalline body including an extension protruding from each junction of said arms, each said extension being formed so that only a small fraction of the area of said each extension is integral with the pair of arms forming said each junction, respectively; first and second pairs of terminals connected to the extensions of the portions of said body at opposite ends of said bridge, respectively; means coupled to said first pair of terminals for establishing current flow in the four integral active resistance arms of said bridge; and electrical detecting means coupled to said second pair of terminals responsive to the change in resistance in the respective resistance arms of said bridge unit as a result of opposite changes in electrical resistance in said body in a direction parallel with and perpendicular to the components of an induced strain in said body respectively.

4. A strain sensitive element comprising: a monocrystalline body of semiconductive material having isotropic electrical characteristics and proportioned to define four integral active reistance arms of a complete four arm unitary resistance bridge wherein the ratio of resistances of two of the resistance arms defining one continuous current path within the semiconductive material of said bridge is equal to the ratio of resistances of the other two resistance arms defining the other continuous current path within the semiconductive material thereof, the arms of said bridge unit being oriented with respect to the crystallographic orientation of said monocrystalline body such that the bridge will exhibit anisotropic elastoresistance characteristics in response to simple forces acting on said element; said semiconductor body being formed with protruding extensions at the areas defining the junction of adjacent arms of said resistance bridge; and nonrectifying terminals connected to said extensions, said extensions providing for symmetrical continuous current flow in the two current paths within the semiconductive material of said resistance bridge.

5. A strain indicating apparatus comprising: a complete unitary four active arm resistance bridge wherein the four integral resistance arms thereof are formed by a single body of monocrystalline semiconductive material having isotropic electrical characteristics, the ratio of resistances of two of the resistance arms defining one continuous current path within the semiconductive material of said bridge being equal to the ratio of resistances of the other two resistance arms defining the other continuous current path within the semiconductive material thereof, the arms of said bridge unit being oriented with respect to the crystallographic orientation of said monocrystalline body such that the bridge will exhibit anisotropic elastoresistance characteristics in response to simples forces acting on said body; said body being formed with protruding extensions at the areas defining the junction of adjacent arms of said bridge; a terminal in substantially nonrectifying connection to each of said extensions; means coupled to a first pair of opposite terminals of said body for establishing current flow in the two continuous current paths of said bridge; and electrical detection means coupled to the remaining opposite terminals of said body.

6. A strain sensitive element comprising: a single monocrystalline body of a semiconductive material having uniform electrical characteristics, said body being formed with a central aperture therein and protruding extensions at opposite extremities thereof, said body defining four integral resistance arms of a complete four active arm unitary resistance bridge wherein the ratio of resistances of two of the resistance arms defining one continuous current path within the semiconductive material of the body is equal to the ratio of resistances of the other two resistance arms defining the other continuous current path within the semiconductive material thereof, the arms of said body being oriented with respect to the crystallographic orientation of said monocrystalline body such that the bridge will exhibit anisotropic elastoresistance characteristics in response to simple forces acting on said element; and a substantially nonrectifying terminal connected to each of the extensions of said monocrystalline body, respectively.

7. A strain sensitive element comprising: a body of monocrystalline semiconductive material having uniform electrical characteristics, said body having ear-like extensions formed at opposite extremities thereof and having length and width dimensions which are substantially equal and large with respect to the thickness thereof, said body being oriented with respect to the crystallographic axes thereof to exhibit a longitudinal elastoresistance coefficient having one polarity and a transverse elastoresistance coefficient having the opposite polarity in response to simple forces acting on said element; and terminals in substantially nonrectifying connection to the ear-like extensions of said body so as to define between said terminals four integral current carrying portions whereby said body itself defines the four integral active resistance arms of a complete four arm resistance bridge wherein each of two parallel current paths are within the semiconductive material thereof.

8. The strain sensitive element of claim 7 wherein said body is in the form of a square.

9. The strain sensitive element of claim 7 wherein said body is in the form of a disk.

10. A strain sensitive element comprising: an annulus of monocrystalline semiconductive material having uniform electrical characteristics, said annulus having ear-like extensions forming outer opposite extremities thereof and being oriented with respect to the crystallographic axes thereof to exhibit a longitudinal elastoresistance coefficient having one polarity and a transverse elastoresistance coefficient having the opposite polarity in response to simple forces acting on said element; and terminals in substantially nonrectifying connection to said ear-like extensions so as to define between said terminals four continuous current carrying paths within the semiconductive material whereby said annulus defines the four integral active resistance arms of a complete four arm resistance bridge.

References Cited by the Examiner

UNITED STATES PATENTS

| | | | |
|---|---|---|---|
| 2,621,276 | 12/1952 | Howland | 73—88.5 X |
| 2,939,317 | 6/1960 | Mason | 73—88.5 X |
| 3,023,627 | 3/1962 | Geyling | 73—141 X |
| 3,079,576 | 2/1963 | Kooiman | 73—88.5 |
| 3,186,217 | 6/1965 | Pfann | 73—88.5 |

OTHER REFERENCES

Fairchild Controls Corp., "New Product Bulletin 3S-G," August 1960.

Herring, Conyers: "Transport Properties of a Many-Valley Semiconductor," Bell System Technical Journal, vol. 34, No. 2, March 1955, pages 237 to 290, pages 251 to 258 relied on.

The Physical Review: article "Piezoresistance Effect in Germanium and Silicon," by C. S. Smith, vol. 94, April-June 15, 1954; pp. 42–49 relied on.

RICHARD C. QUEISSER, *Primary Examiner.*

ROBERT L. EVANS, JOSEPH F. STRIZAK, *Examiners.*

R. R. MEWHINNEY, ERNEST F. KARLSEN, CHARLES A. RUEHL, *Assistant Examiners.*